Nov. 7, 1933.   R. HILLNER   1,934,465
INSERTED TOOTH CUTTER
Filed Feb. 16, 1931

Inventor:
Rudolph Hillner;
by Charles Mullan
His Attorney.

Patented Nov. 7, 1933

1,934,465

UNITED STATES PATENT OFFICE 1,934,465

INSERTED TOOTH CUTTER

Rudolph Hillner, Schenectady, N. Y., assignor to General Electric Company, a corporation of New York Application February 16, 1931. Serial No. 516,087

1 Claim. (Cl. 29—105)

The present invention refers to cutters of the inserted blade type in which a plurality of blades or teeth are inserted in a rotary body.

The high cost of modern tool steel and the difficulty of machining such steel make it necessary to use this material with great economy. It is obvious, therefore, that larger tools should not entirely be made of such highly expensive tool steel but that this material should be provided only where it enters the surfaces of the piece to be machined and that the main part of such tools should be made of a material less expensive, easier to machine and also less brittle than tool steel.

In the manufacture of rotary cutters which comprise a body and a plurality of blades inserted in suitable recesses it is necessary to fasten the blades rigidly to the body in order to prevent loosening and to obtain the same cutting qualities as would be obtained with a tool in which said blades or teeth form an integral part with the tool body. To achieve this end it has heretofore been the practice to insert these blades or teeth in the form of wedges in tapered slots or recesses provided in the body of the tool. In order to prevent lateral displacement of the blades and at the same time to allow lateral adjustability thereof it has previously been suggested to provide one side of said recesses with serrations co-acting with corresponding serrations provided on one side of the tapered blades.

These constructions, however, have the disadvantage that the teeth do not bottom the slots, thus leaving a space between the bottom of the teeth and the bottom of the slots.

Furthermore, it will be clear that the slightest differences between the tapered form of the teeth and the slots will greatly affect the desired uniform distribution of forces exerted on the teeth and transferred to the body of the tool. These cutters, therefore, do not always fulfill the requirements of a rigid construction which is indispensable in modern, rational manufacturing methods.

According to my invention I provide improved fastening means for such teeth which overcome the above mentioned disadvantages and permit the manufacture of a more reliable cutting tool having the same cutting qualities as those made of an integral stock of tool steel.

For a consideration of what I believe to be novel and my invention, attention is directed to the following description and claims in connection with the attached drawing.

Figure 1:
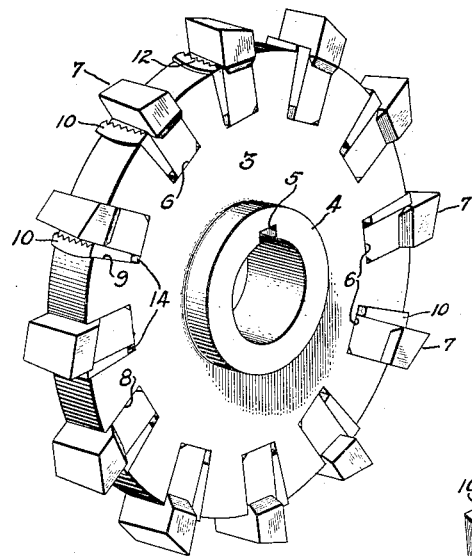
Figure 4:
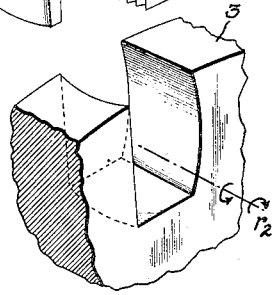
Figure 3:
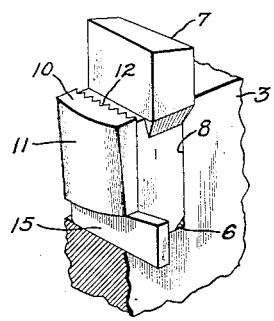
Figure 2:
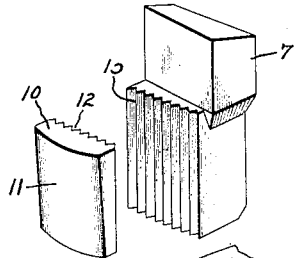
Figure 2:
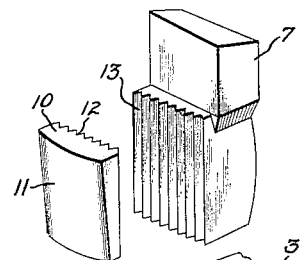
Figure 2:
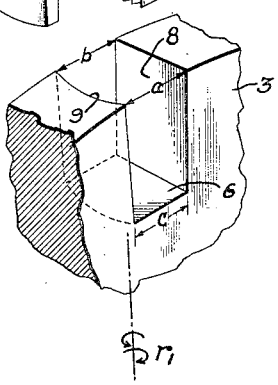

Referring to the drawing, Fig. 1 illustrates in perspective a cutter embodying my invention, and Fig. 2 illustrates a perspective view of a part of Fig. 1 enlarged and disassembled. Figs. 3 and 4 illustrate modifications embodying my invention.

Referring to Fig. 1, 3 designates the body of a cutter having a hub 4 in which a slot 5 is provided for securing the body to a suitable shank. The circumference of the body is provided with a plurality of slots 6 in which teeth 7 are inserted. According to my invention I provide these slots with one plane side 8 (Fig. 2) and with one cylindrically-shaped side 9 in tapered relation to said plane side. The teeth 7 are pressed against one side of the slots and against the bottom of the slots by means of wedges 10 which are driven into said slots between the teeth and the cylindrically-shaped sides of the slots. Each of these wedges according to my invention is provided with one cylindrically shaped side 11 coacting with the corresponding side 9 of the slot, the other side of said wedge being provided with serrations 12 coacting with corresponding serrations 13 of the tooth 7. The wedges are substantially of the same axial width as the slots, as shown in the drawing, and the cylindrical formations of one side of each slot and wedge have equal radii of a length such that the arc length of the cylindrical formations of the wedges and slots is considerably less than 180 angular degrees. It will be clearly seen that the cylindrical arrangement between the wedge and the slot has an equalizing effect regarding slight differences between the circumferential widths of the slot and the tooth including the wedge to be inserted therein. This arrangement has the effect that forces asserted on the wedge while being driven in the slot are distributed over the entire adjacent parts of the tooth and the body.

The serrations between the teeth and the wedges prevent the teeth from moving laterally and also allow a lateral adjustment thereof. For removing a tooth from the body, two wedge-like members may be inserted from opposite sides into the space 14 formed between the bottom of the wedge and the bottom of the slots. It is, however, preferable to provide the wedge with an inclined bottom, as illustrated in Fig. 3, so that a single key 15 will be sufficient to drive out the wedge.

Whereas I have shown in Fig. 2 the wedge as being provided with a cylindrical surface and the cutter blade with a plane surface, the opposite arrangement may be provided, that is, the wedge may be provided with a plane surface and the cutter blade with a cylindrical surface.

The cylindrical arrangement has an equalizing effect as far as differences between the circumferential widths of the slot and the members to be inserted therein are concerned. The following will make this clearer: Suppose the widths $a$ and $b$ of the slot in Fig. 2 differ somewhat from the corresponding widths of the members to be inserted in the slot; in this case the cylindrical arrangement will allow the members to be inserted in the slot to turn somewhat in the direction of arrows $r_1$ resulting in a tight fit between these members and the sides of the slots and thus preventing buckling of the body of the tool.

Fig. 4 shows an arrangement in which the wedge is provided with a cylindrical surface, as in Fig. 2, and the blade is also provided with a cylindrical surface but in the direction axial to the tool. The arrangement of the second cylindrical surface eliminates slight differences between the tapered form of the slot and the members to be inserted therein, that is, it compensates for differences in the ratios $a:c$, see Fig. 2, of the slot and the members to be inserted therein. It allows a slight turning, that is, free positioning in the direction of the arrows $r_2$ indicated in Fig. 4.

In accordance with the provisions of the patent statutes I have described the principle of my invention, together with the apparatus which I now consider to represent the best embodiment for carrying out my invention but I desire to have it understood that the apparatus as shown is only illustrative thereof and that changes may be made without departing from the scope of my invention.

What I claim as new and desire to secure by Letters Patent of the United States is:

A rotary cutter comprising a body having a plurality of tapered slots each of said slots having one plane side and one cylindrically-shaped side, cutting blades having one plane side engaging the plane side of said slots, a wedge having one cylindrically shaped side in each slot and adapted to press said cutting blades against the plane side and the bottom of the slot, the cylindrically shaped side of the slot extending over the full width of the slot and having an arc length of less than 180 angular degrees, said cutting blades and wedges having parallel serrations running in a substantially radial direction of the body and coacting with each other to prevent the cutting blades from moving laterally, the cylindrically formed sides of said slot and wedge engaging each other to cause equalization of differences in circumferential widths of said slot and blades.

RUDOLPH HILLNER.